May 15, 1962 P. RAINVILLE ETAL 3,034,585
POTATO DIGGER AND PICKER COMBINE
Filed Aug. 26, 1959 3 Sheets-Sheet 1

INVENTORS-
PAUL RAINVILLE
PERCY LANGDON
BY
Mead, Browne, Schuyler & Beveridge
ATTORNEYS May 15, 1962   P. RAINVILLE ETAL   3,034,585
POTATO DIGGER AND PICKER COMBINE
Filed Aug. 26, 1959   3 Sheets-Sheet 2

INVENTORS-
PAUL RAINVILLE
PERCY LANGDON
BY
ATTORNEYS

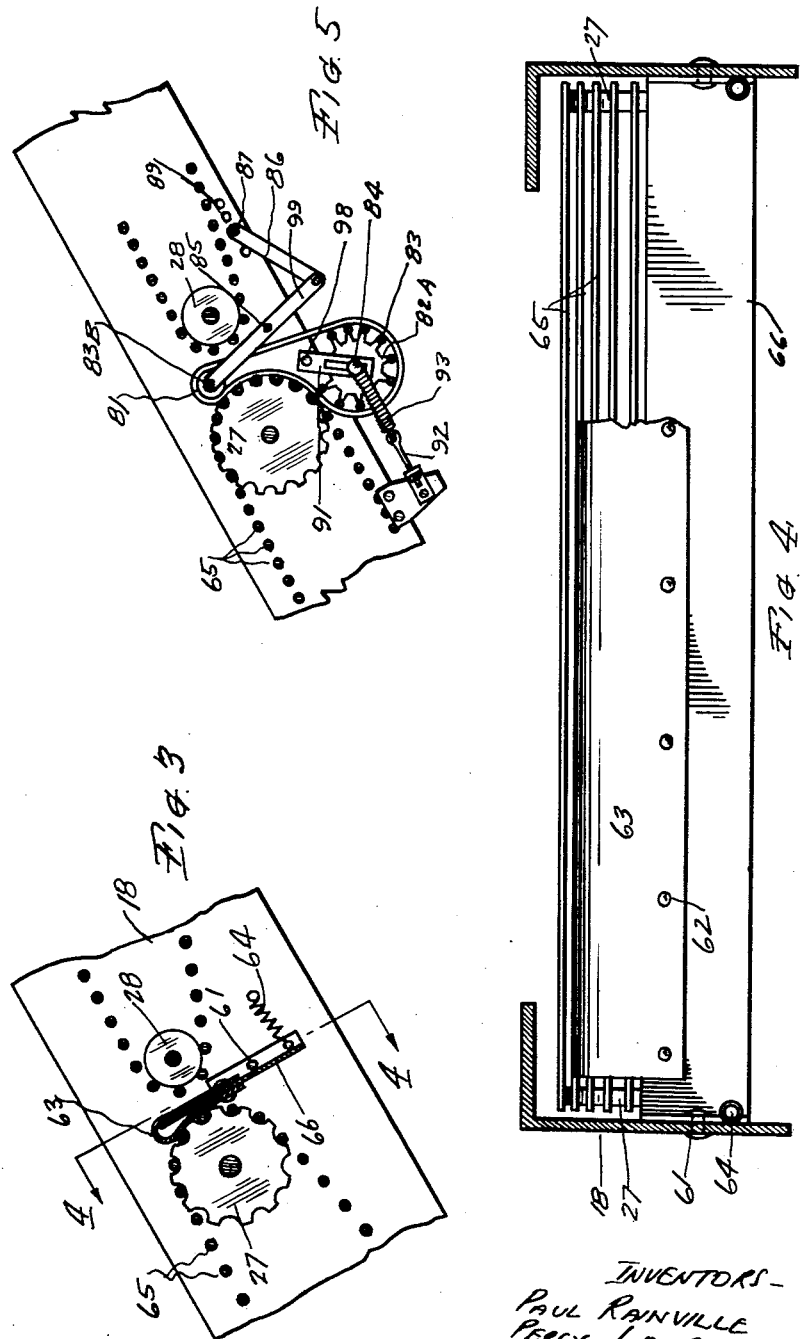

United States Patent Office 3,034,585
Patented May 15, 1962

3,034,585
POTATO DIGGER AND PICKER COMBINE
Paul Rainville, R.R. 1, Chelmsford, Ontario, Canada, and Percy Langdon, Val Caron, Ontario, Canada
Filed Aug. 26, 1959, Ser. No. 836,253
2 Claims. (Cl. 171—28)

This invention relates to a potato digger and picker combine.

More particularly, the invention relates to a potato digger and picker combine having means for removing the stems, weeds, and clods of earth from the potatoes.

The principal object of the invention is to provide in a potato digger and picker combine, novel and efficient means for separating the stems, weeds and clods from the potatoes.

Potato digger and picker combines have an endless belt or conveyer on which the potatoes are carried after being picked, to a bag at the rear of the machine. According to the invention, two or more of such conveyers are used, end to end, and means are disposed between two adjacent belts by which the stems, etc., are separated from the potatoes, the potatoes minus the stems, etc., finally falling into the bag.

Figure 1:
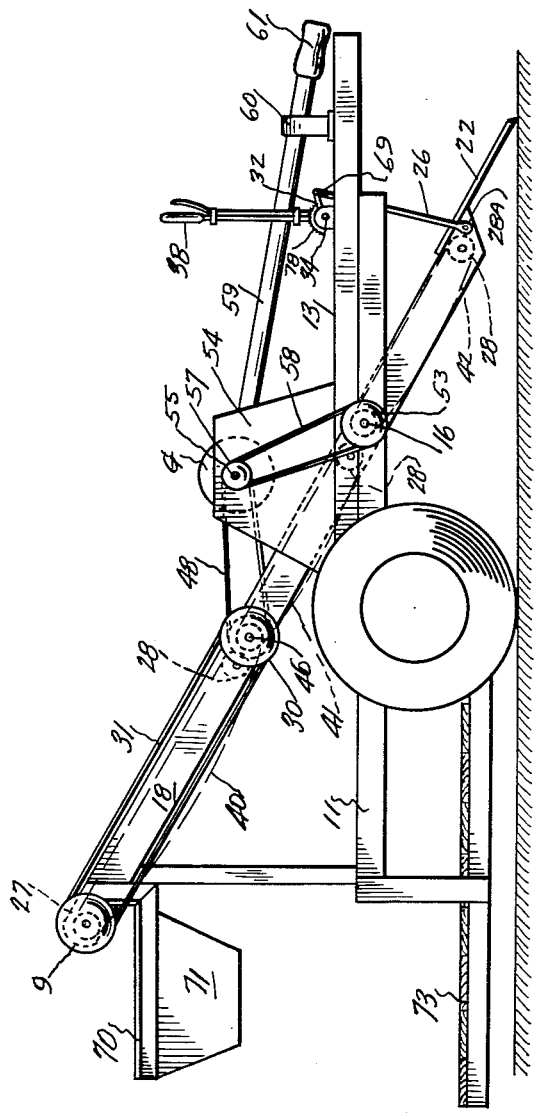
Figure 2:
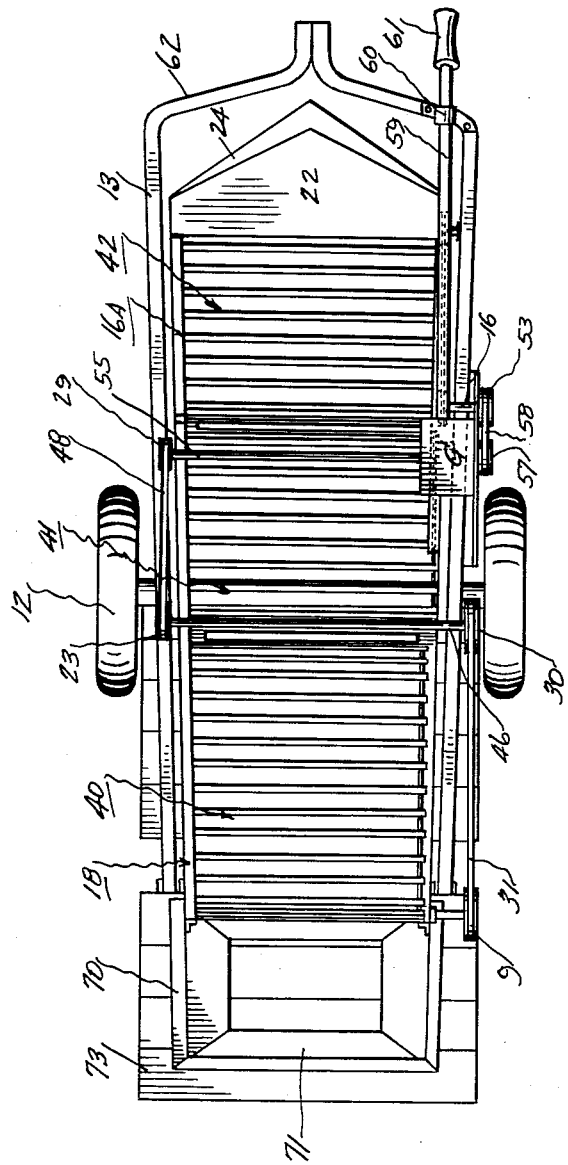

In the drawings, wherein like numerals of reference indicate corresponding parts in the various figures, FIGURE 1 is a side elevation of the machine;
FIGURE 2 is a plan view of FIGURE 1;
FIGURE 3 is a fragmentary longitudinal vertical section on an enlarged scale;
FIGURE 4 is a section on line 4—4 in FIGURE 3; and,
FIGURE 5 shows a modification.

Referring now by numerals to the drawings, 10 shows a rigid frame of which 11 are its two side members or sills, suitably supported on a pair of wheels 12. The frame includes a V-shaped boom 62 formed by two angle members 13 extending forwardly from the side sills 11 and secured together at their forward extremities.

The forward end of the boom 62 is provided with suitable means (not shown) for pivotal connection to the draw bar of a conventional tractor (not shown). The frame 10 of the machine is in substantially horizontal, operative position when the boom is operatively connected to the draw bar of the tractor.

Preferably, the machine (more particularly the conveyer system) is such that the centre of gravity of the conveyer lies closely to the axis of the two supporting wheels 12, but slightly in advance of such axis, so that little bending movement will be imposed upon the boom.

Rigidly supported by the machine frame 10, is a rear conveyer frame 18. Pivotally supported at its rear end as on a shaft 16 is a forward conveyer frame 16A. A plate 22 is rigidly carried by the forward end of the frame 16A. The plate is formed with two relatively-angularly disposed forward edges 24 (see FIGURE 2), and serves as what is called a "digger point."

On the rear conveyer frame 18 are mounted two endless conveyers 40 and 41, in spaced, end to end relationship. Also mounted on the forward conveyer frame 16A is an endless conveyer 42.

The conveyer frame 16A is adjustable on the axis of the shaft 16, to regulate the penetration or the depth of the digger point into the ground. As shown, links 26 are pivotally connected at one end as at 28A, to the side members of the conveyor frame 16A. The other or upper ends of the links 26 are slotted longitudinally as at 69 for sliding, lost motion connection with pins 30 on the ends of levers 32 fixed to a shaft 34 journalled in suitable bearings or brackets supported by the boom. Fixed to one end of the shaft 34 is a latch-controlled lever 38 cooperating with a toothed quadrant 78 fixed to one of the side sills of the boom 62. The angular position of the conveyer frame is thus adjustable by the lever 38.

In practice, the digger point or plate must be raised clear of the ground when the machine is to be turned, as at the end of a straight run. This should preferably be done without having to interfere with or manipulate the lever 38. Accordingly, suitable means (not shown) may be provided by which the forward frame 16A will be lifted relatively to the machine frame 10. As a lost motion connection is provided between the links 26 and the lever 32, as already stated, the forward end of the forward conveyer frame 16A may thus be lifted without affecting the position or setting of the lever 38.

The endless conveyers—preferably three in number—are shown at 40, 41 and 42, as aforesaid. All three such conveyers may be of a conventional design, such as used in conventional potato digging machines; they are usually called "bar conveyers." Such conveyer, as the term implies, includes spaced rods 65 assembled in spaced parallel relationship as by double-eye links, to form the belt or conveyer proper. We prefer to cover every second bar of the conveyers or belts with rubber to prevent bruising of the potatoes.

The belt of each conveyer is trained around reaward sprockets 27 and forward idlers 28, respectively (see particularly FIGURE 3). The sprockets are operatively engaged by the transverse rods of the belts, by which sprockets the belts are operated. For purposes of the present invention, the forward idlers are of a diameter smaller than that of the rearward sprockets, as best seen in FIGURE 3, but, for convenience in drafting, they are not so shown in FIGURE 1.

The sprockets 27 and idlers 28 are fixed to shafts journalled in the conveyer frames. Turning with the shafts on which the sprockets are fixed, are sprocket chains (to be referred to later.)

Journalled in upright plates 54 rising from the sides of the machine frame 10 is a transverse shaft 55. To one end (the nearest end) of the shaft is fixed a sprocket 57. Fixed to the corresponding (nearest) end of the shaft 16, on which the rearward sprockets 27 of the endless belt 42 are fixed, is a sprocket 53. Trained between the sprockets 57 and 53 is a sprocket chain 58.

Fixed to the opposite (farthest) end of the shaft 55 is a sprocket 29. Fixed to the corresponding end of a shaft 46 on which the sprockets 27 of the conveyer 41 are fixed, is a sprocket 23. Trained around the sprockets 23 and 29 is a sprocket chain 48.

Fixed to the front end of the shaft mounting the sprockets 27 of the conveyor 40 and the front end of the shaft 46 are sprockets 9 and 30. Trained around these two sprockets is a sprocket chain 31.

Thus, if the shaft 55 is rotated, then all three conveyers will be rotated simultaneously, in the same operative direction, so that potatoes will be carried from the front of the machine to the rear of the machine where they fall into a hopper (to be referred to).

Operatively coupled to the transverse shaft 55 is a conventional gear box G including intermeshing gears (not shown) fixed, respectively, to the shaft 55 and a shaft 59 that is suitably journalled at its forward end in a bearing 60 carried by the boom. The forward end of the shaft 59 carries a suitable universal coupling 61 for operative connection or coupling with the power take-off of a tractor (not shown). Thus, the three conveyer units are actuated simultaneously from the power take-off when the machine is coupled to the tractor, to be drawn thereby.

Fixed to the rear end of the rearward conveyer frame are brackets 70 from which a chute 71 is suspended. The chute serves to direct the potatoes falling off the rear of the rearward conveyer, into a bag (not shown) supported on a platform 73.

As the machine is drawn forwardly (by the tractor) with the digger plate 22 underground, the potatoes are dug out of the ground and are pushed up by the loose earth onto the forward (lower) end of the forward conveyer 42. The conveyer raises the potatoes to the next conveyer 41, and thence to the rear conveyer 40, from which they fall into the chute 71.

As already stated, means are disposed between adjacent ends of adjacent conveyers for separating stems from the potatoes, and also for separating weeds, clods and earth, or other debris, from the potatoes.

One form of such means is best shown in FIGURE 3. Between adjacent ends of two adjacent co-operating conveyers, a transverse plate 66 is pivotally supported by the conveyer frame side sills, as by pins or the like 61. Secured to the plate, as by rivets 62, is a looped web or member 63, preferably rubber belt material, extending upwardly to lie between adjacent ends of the two adjacent conveyers.

The web-supporting plate 66 is spring-loaded, as by a tensioned coil spring 64, to be urged counterclockwise (as seen in FIGURE 3), so that one run or side of the loop is urged against and is successively engaged by the rods of the conveyer, as the rods of such conveyer successively reach the ends of their travel toward the adjacent end of a succeeding conveyer.

As the potatoes are being carried on a conveyer, to be transferred from such conveyer to the next (succeeding) one, it is found that the stems of the potatoes are caught or tend to be caught between the conveyer, more particularly between the rods of the conveyer, and the member 63, and dragged or pulled downwardly. The potato stems are separated from the potatoes proper and fall to the ground; and the potatoes roll or fall over the member 63 and upon the succeeding conveyer. Similarly, any weeds, earth, or other debris, are urged downwardly between the conveyer rods and the member 63, to fall to the ground.

In the form shown in FIGURE 5, the member 63 (FIGURE 3) is replaced by a number of spaced, free-running endless belts 80 having one run engaging the belt of the succeeding conveyer, more particularly the rods, and pressing thereagainst. A number of such belts are preferable to a single belt. In practice, at least two belts are used; one at each end of the two first conveyers.

The endless belts 80 are trained between an upper roller 81 and a lower drum 82A. In practice, the roller 81 will be 1" in diameter.

The lower drum is made up of two sprockets 82 rotating on a shaft 90; to the ends of the teeth of the sprockets are welded tranverse rods 84. It is found that such a structure is best adapted to cause loose earth, weeds and other debris such as may drop between the spaced belts onto the drum, to fall to the ground.

The upper roller 81 is pivoted as at 83B in a pair of levers 99 pivotally supported on the side sills of the frame 10, as at 85. The angular position of the levers may be adjusted by means of links 86, pivotally connected at their lower ends to the levers 99 and being adapted at their outer ends to be adjustably connected to the side sills as by a bolt 87, selectively inserted into a number of closely spaced holes 89 made through the side sills. In practice, the adjustment is such that the upper roller barely clears the conveyer.

The shaft 90 of the lower drum is slidably received in longitudinally-slotted arms 91 pivotally suspended from the side sills as at 98. Tensioned between the ends of the shaft 90 and the eye-bolts 92 are coil springs 93, so that the belt (or belts) 80 is always under tension.

A machine in accordance with the invention is also adapted to dig up turnips, cut their roots and leaves without damaging the bulbs, the bulbs being carried to the collecting bag.

What we claim as our invention is:

1. In a potato digging machine, a forward digging means, longitudinally-spaced-apart endless bar conveyers rearwardly of said digging means operative to carry the potatoes dug up by said digging means toward the rear of the machine, and means between cooperative such conveyers for separating the stem from the potato, said stem-potato separating means comprising two spaced apart rollers, an endless belt trained around said rollers presenting a run to a preceeding such conveyer, a pair of pivoted levers mounting one of said rollers, means for selectively adjusting the rotary position of said levers, means slidably mounting the other roller, and spring means for retaining said belt under tension with said run of said belt in engagement with the preceeding conveyer so that the bars of such conveyer successively slidably engage said run to separate the potato from its stem.

2. In a potato digging machine, a forward digging means longitudinally-spaced-apart endless bar conveyers rearwardly of said digging means operative to carry potatoes dug up by said digging means toward the rear of the machine, and means between cooperative such conveyers for separating the stem from the potato, said stem-potato separating means comprising a pair of spaced-apart rollers, an endless belt trained around said rollers presenting a run to the rear end of a preceeding conveyer, and means including a tensioned spring for maintaining said belt under tension with said run in engagement with such preceeding conveyer so that the bars of such conveyer successively slidably engage said run to separate the potato from its stem.

References Cited in the file of this patent
UNITED STATES PATENTS

| | | |
|---|---|---|
| 316,015 | Dowden | Apr. 21, 1885 |
| 2,711,742 | Lavers | June 28, 1955 |
| 2,830,592 | Rainville et al. | Apr. 15, 1958 |
| 2,861,686 | Johnson | Nov. 25, 1958 |